United States Patent [19]

Armfield

[11] 4,095,665
[45] Jun. 20, 1978

[54] ELECTRIC CAR

[75] Inventor: Donald A. Armfield, Scranton, Pa.

[73] Assignee: The Raymond Lee Organization, Inc., New York, N.Y.

[21] Appl. No.: 793,883

[22] Filed: May 5, 1977

[51] Int. Cl.² .......................... B60L 7/12; B60K 1/07
[52] U.S. Cl. ................................ 180/65 D; 318/139; 320/61
[58] Field of Search ............... 180/65 D, 65 R, 65 A, 180/65 F, 65 E, 60, 57, 56, 55; 318/139; 320/61, 62, 2

[56] References Cited

U.S. PATENT DOCUMENTS

| | | | |
|---|---|---|---|
| 1,562,903 | 11/1925 | Miller | 180/65 D |
| 3,367,438 | 2/1968 | Moore | 180/65 A |
| 3,499,163 | 3/1970 | Verrault | 290/16 |
| 3,530,356 | 9/1970 | Aronson | 180/65 D X |
| 3,874,472 | 4/1975 | Deane | 320/61 X |

Primary Examiner—Joseph F. Peters, Jr.
Assistant Examiner—Milton L. Smith
Attorney, Agent, or Firm—Howard I. Podell

[57] ABSTRACT

A vehicle powered by an electric motor linked by a first clutch to a first shaft of a gear box, with a generator linked by a second clutch to a second shaft of the gear box, with the gear box linked by a third shaft to the drive shaft of a vehicle wheel. Both clutches are electrically controlled so that the generator may be driven from the gear box when the vehicle is decelerating with the first clutch disengaged, with the generator disconnected by the second clutch when the first clutch is engaged to link the motor to the gear box. The generator serves to charge the batteries that drive the motor, as a regenerative braking system. The first and second shafts of the gear box are linked in the gear box by different gear ratios to each other and the third shaft that is joined to the vehicle drive shaft.

3 Claims, 2 Drawing Figures

ELECTRIC CAR

SUMMARY OF THE INVENTION

My invention is a vehicle powered by an electric motor linked by a first clutch to a first shaft of a gear box, with a generator linked by a second clutch to a second shaft of the gear box, with the gear box linked by a third shaft to the drive shaft of a vehicle wheel. Both clutches are electrically controlled so that the generator may be driven from the gear box when the vehicle is decelerating with the first clutch disengaged, with the generator disconnected by the second clutch when the first clutch is engaged to link the motor to the gear box. The generator serves to charge the batteries that drive the motor, as a regenerative braking system. The first and second shafts of the gear box are linked in the gear box by different gear ratios to each other and the third shaft that is joined to the vehicle drive shaft.

By means of my invention, the batteries of the vehicle may be partially recharged during periods of deceleration of the vehicle so as to extend the period between charging of the batteries and to conserve braking energy.

Regenerative electric braking systems have been employed in the past, utilizing the motor as a generator, but generally suffer from the fact that the motor does not efficiently serve as a generator at low velocities of rotation.

The use in my invention of a separate electric motor and generator, each linked by different gear ratios to the drive shaft by independent clutches permits the motor and the generator to operate alternately and at different velocities for a given vehicle speed so as to permit the generator to be rotated at a higher velocity than the motor for a given velocity of the drive shaft.

BRIEF DESCRIPTION OF THE DRAWINGS

The objects and features of the invention may be understood with reference to the following detailed description of an illustrative embodiment of the invention, taken together with the accompanying drawings in which.

Figure 1:
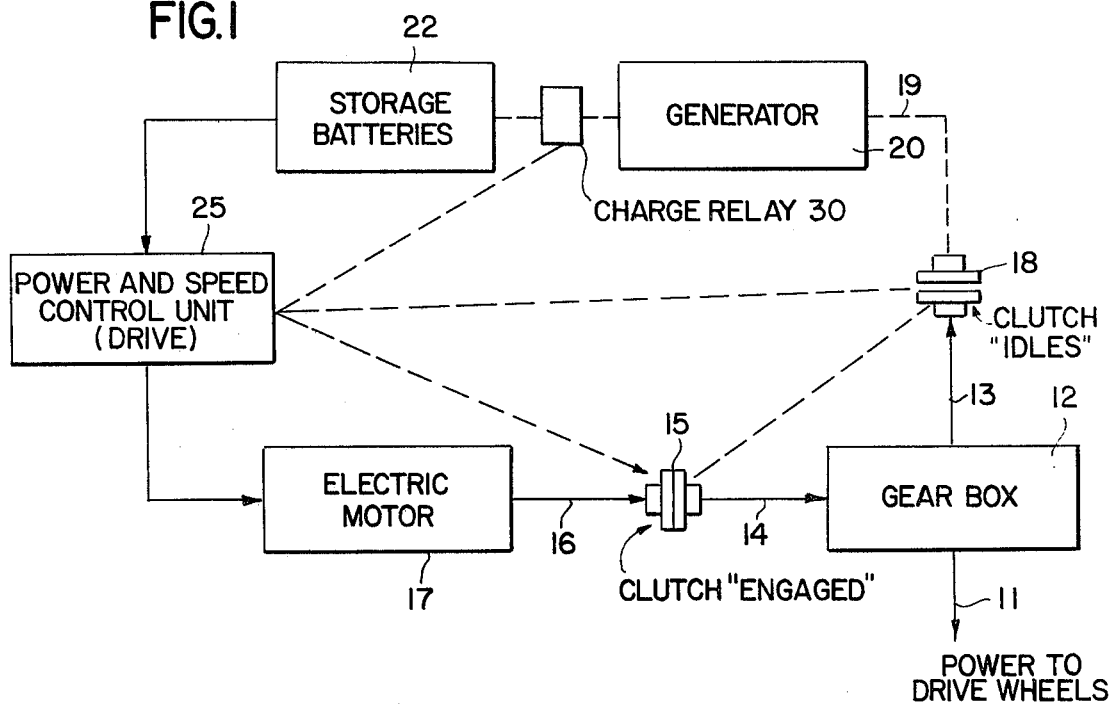
FIG. 1 is a schematic diagram of my invention, in the Drive mode.
Figure 2:
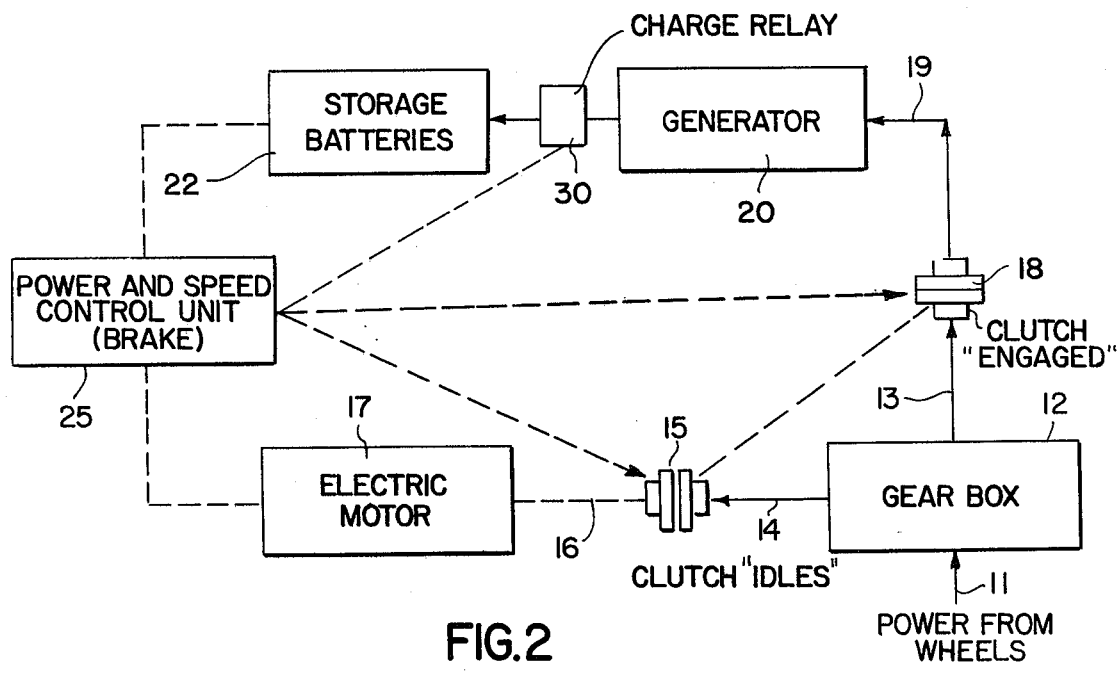
FIG. 2 is a schematic diagram of my invention in the generating mode.

DESCRIPTION OF THE PREFERRED EMBODIMENt:

Turning now descriptively to the drawings, in which similar reference characters denote similar elements throughout the several views, FIGS. 1-2 are schematic diagrams of my invention in which the drive shaft 11 of a vehicle is linked by a gear box 12 to a first shaft 14 and a second shaft 13 with a first clutch 15 joining first shaft 14 to the shaft 16 of an electric motor 17 and a second clutch 18 joining second shaft 13 to the shaft 19 of an electric generator 20.

Motor 17 is powered by storage batteries 22 which are electrically connected to motor 17 through a control unit 25 that regulates the speed of motor 17 when set to the Drive mode, with control unit 25 also serving to control charge relay 30 and clutches 15 and 18.

Clutches 15 and 18 are each independently electrically actuated, determined by the Control Unit 25 so that when Control Unit 25 is in the DRIVE mode as shown in FIG. 1 clutch 15 is engaged to link motor shaft 16 to first gear box shaft 14, so that motor 17 rotates drive shaft 11 with clutch 18 set to the idle position to disengage gear box second shaft 13 from generator shaft 19 and to open the circuit to charge relay 30 to disconnect generator 20 from batteries 22. The speed of motor 17 is in a conventional manner by control unit 25 in the DRIVE mode.

Alternatively, when the vehicle is to be decelerated, control unit 25 is set to the BRAKE mode and clutch 15 is disengaged to the idle position with clutch 18 engaged to link generator shaft 19 to second gear box shaft so that rotation of vehicle drive shaft 11 causes generator 20 to generate electricity, and control unit closes the circuit to charge relay 30 to connect generator 20 to batteries 22 so as to charge batteries 22 while braking the rotation of vehicle drive shaft 11 which is linked in conventional manner to the drive wheels of the vehicle. Charge relay is fitted with internal means to disconnect generator 20 from batteries 22 when the generator is not producing sufficient voltage to charge batteries 22.

First and second shafts 14 and 13 respectively are each linked to drive shaft 11 in gear box 12 by different gear ratios so that generator 20 will rotate at a higher velocity at a given vehicle and drive shaft velocity than will motor 17 when the generator or motor is engaged by the respective clutch 15 or 18 respectively.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An electro-mechanical drive and brake system for a vehicle comprising,
    an electric motor, the shaft of which is linked by a first electric actuated clutch when engaged to a first shaft of a gear box,
    an electric generator, the shaft of which is linked by a second electric actuated clutch when engaged to a second shaft of said gear box,
    a rechargeable battery which is electrically linked by a control unit to said motor, said control unit also being independently linked to each clutch and to a relay, contacts of which join the generator to said battery when the relay is set to a first mode and disconnect the generator from said battery when the relay is set to a second mode,
    said gear box linking both said first shaft and said second shaft to the drive shaft of the vehicle.

2. The combination as recited in claim 1 in which the control unit in a first mode connects the motor to the battery and actuates the first clutch to the engaged position while simultaneously actuating the second clutch to the disengaged position, with said control unit in a second mode disconnecting the motor from the battery, and actuating the first clutch to the disengaged position while simultaneously actuating the second clutch to the engaged position and the relay to the first mode so as to electrically link the generator to the battery.

3. The combination as recited in claim 1 in which the first shaft and the second shaft are internally linked by different gear ratios in the gear box to the drive shaft.

* * * * *